United States Patent
Inata et al.

(10) Patent No.: US 10,554,986 B2
(45) Date of Patent: Feb. 4, 2020

(54) ENCODING METHOD AND ENCODING DEVICE

(71) Applicant: MAXELL, LTD., Kyoto (JP)

(72) Inventors: Keisuke Inata, Tokyo (JP); Mitsuhiro Okada, Tokyo (JP); Hiroki Mizosoe, Tokyo (JP)

(73) Assignee: Maxell, Ltd., Kyoto (JP)

( * ) Notice: Subject to any disclaimer, the term of this patent is extended or adjusted under 35 U.S.C. 154(b) by 16 days.

(21) Appl. No.: 14/784,796

(22) PCT Filed: Apr. 19, 2013

(86) PCT No.: PCT/JP2013/061566
§ 371 (c)(1),
(2) Date: Oct. 15, 2015

(87) PCT Pub. No.: WO2014/171001
PCT Pub. Date: Oct. 23, 2014

(65) Prior Publication Data
US 2016/0080750 A1    Mar. 17, 2016

(51) Int. Cl.
*H04N 19/182* (2014.01)
*H04N 9/64* (2006.01)
(Continued)

(52) U.S. Cl.
CPC ......... *H04N 19/184* (2014.11); *H04N 19/172* (2014.11)

(58) Field of Classification Search
CPC .... H04N 19/186; H04N 19/136; H04N 19/40; H04N 19/176; H04N 19/184;
(Continued)

(56) References Cited

U.S. PATENT DOCUMENTS

2011/0039508 A1* 2/2011 Lindahl ................. G06F 1/3203
455/230
2012/0206470 A1* 8/2012 Frank .................... H04N 1/4078
345/581
(Continued)

FOREIGN PATENT DOCUMENTS

JP    07-131655 A    5/1995
JP    7-284126 A    10/1995
(Continued)

OTHER PUBLICATIONS

International Search Report of PCT/JP2013/061566.
Japanese Office Action received in corresponding Japanese Application No. 2017-022276 dated Feb. 1, 2018.

*Primary Examiner* — Alison Slater
(74) *Attorney, Agent, or Firm* — Mattingly & Malur, PC (57) ABSTRACT

Reduction in power consumption is not considered in the prior art documents. Provided is an encoding method for encoding image information and having: a step in which image information is input; an analysis step in which the characteristics of the input image information are analyzed; a bit depth output step in which the bit depth for video encoding is determined and output; and an encoding step in which the bit depth output in the bit depth output step is used and the input image information is encoded. The encoding method is characterized by the output bit depth being switched in the bit depth output step, on the basis of the analysis results from the analysis step.

20 Claims, 5 Drawing Sheets

(51) Int. Cl.
*H04N 9/77* (2006.01)
*H04N 19/184* (2014.01)
*H04N 19/172* (2014.01)

(58) Field of Classification Search
CPC .... H04N 19/102; H04N 19/119; H04N 19/12; H04N 19/15; H04N 19/17; H04N 19/172; H04N 19/85; G06T 11/001; G06T 7/00; G06T 7/90; G06T 2207/20208; G06T 5/009; G06T 5/007
See application file for complete search history.

(56) References Cited

U.S. PATENT DOCUMENTS

| | | | |
|---|---|---|---|
| 2012/0275509 A1* | 11/2012 | Smith | H04N 19/147 375/240.01 |
| 2013/0202201 A1* | 8/2013 | Park | H04N 19/176 382/165 |
| 2013/0235942 A1* | 9/2013 | Su | H04N 19/139 375/240.29 |
| 2014/0204246 A1* | 7/2014 | Nishi | H04N 5/2355 348/239 |
| 2016/0261885 A1* | 9/2016 | Li | H04N 19/176 |

FOREIGN PATENT DOCUMENTS

| | | |
|---|---|---|
| JP | 2001-8092 A | 1/2001 |
| JP | 2003-169284 A | 6/2003 |
| JP | 2005-354170 A | 12/2005 |
| JP | 2007-266749 A | 10/2007 |

* cited by examiner

ENCODING METHOD AND ENCODING DEVICE

TECHNICAL FIELD

A technical field relates to video encoding.

BACKGROUND ART

PATENT LITERATURE 1 describes a technique of "assigning an upper bit-plane group as a base layer, and a bit-plane group having the larger number of bits including the upper bit-plane group as an enhancement layer in a plurality of bit-planes that give image data when hierarchically encoding a moving image, and generating encoded data of the enhancement layer by encoding a difference between the layers of a differential picture by prediction in the enhancement layer and a differential picture by prediction in the base layer in the enhancement layer" (see [0007] in PATENT LITERATURE 1) as a solving means for an object of "providing an encoding technique to efficiently performing encoding by imparting a pixel depth different for each moving image" ([0006] in PATENT LITERATURE 1).

CITATION LIST

Patent Literature

PATENT LITERATURE 1: JP-A-2007-266749 (FIG. 1)

SUMMARY OF INVENTION

Technical Problem

However, the reduction of power consumption is not considered in PATENT LITERATURE 1.

Solution to Problem

In order to solve the above-described problem, a configuration described in, for example, the claims is employed.

The present application includes a plurality of means to solve the above-described problem, and an example thereof is an encoding method including: a step in which an image information is inputted; an analysis step of analyzing a feature of the inputted image information; a bit-depth output step of determining and outputting a bit-depth with respect to video encoding; and an encoding step of performing an encoding process on the inputted image information using the bit-depth output in the bit-depth output step, wherein, in the bit-depth output step, a bit-depth to be output is switched based on an analysis result in the analysis step.

Advantageous Effects of Invention

According to the present invention, it is possible to reduce power consumption by changing a bit-depth depending on a feature of an image or a remaining amount of power.

DESCRIPTION OF EMBODIMENTS

Recently, a need for high gradation of an image has been increased in a video encoding process so as to realize a high image quality of video content, digitization of an in-vehicle camera, and further improvement of stability in a monitoring system.

In H.264/AVC standard, which is a typical video encoding method, a profile is defined according to a bit-depth, and it is possible to realize the high gradation by performing video encoding with a high bit-depth.

In the following embodiments, a description will be made regarding an encoding device that realize high gradation of an image, and further reduce power consumption, and a system using the same.

First, a description will be made regarding an outline of an in-vehicle camera system, a monitoring system and a teleconference system to which the encoding device of the present embodiments is applied.

Figure 11:
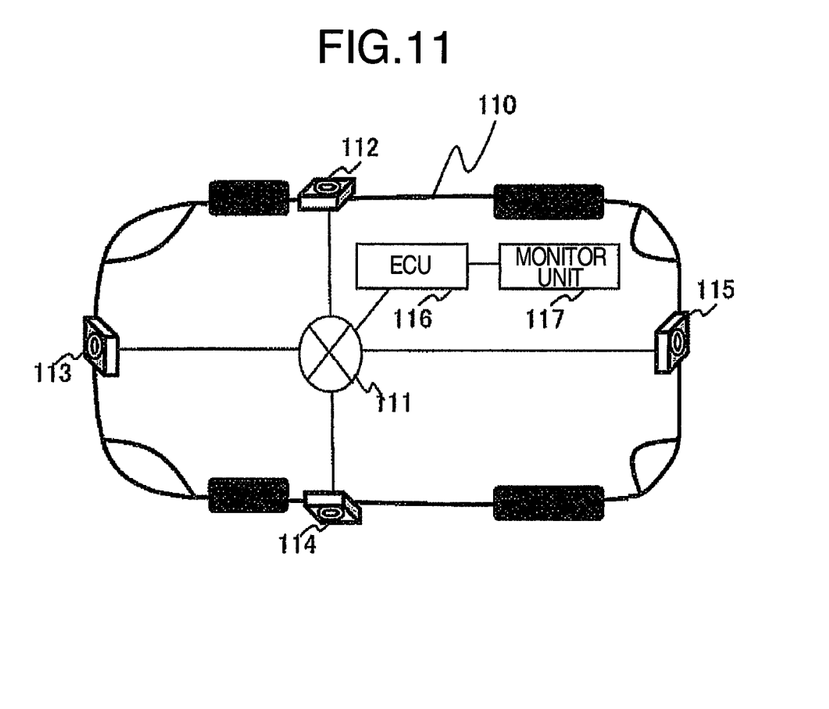
FIG. 11 is an example of an in-vehicle camera system.

FIG. 11 is a block diagram illustrating an example of the in-vehicle camera system. In this example, network 111 is equipped in vehicle 110, and camera units 112, 113, 114 and 115, ECU (Engine Control Unit) 116 are connected to network 111. In addition, monitor unit 117 is connected to the ECU.

Camera units 112, 113, 114 and 115 transmit photographed ambient video information of vehicle 110 to network 111. The video information may be transmitted to network 111 as an uncompressed state, or may be transmitted to network 111 after being subjected to compression processing in camera units 112, 113, 114 and 115.

ECU 116 receives the video information transmitted to network 111, and outputs the video information to monitor 117. ECU 116 performs decompression processing in a case where the video information to be input is compressed, and outputs the obtained decoded video information to monitor 117.

Monitor unit 117 performs video display of the received video information. ECU 116 and camera units 112, 113, 114 and 115 are capable of exchanging a control signal via network 111. For example, it is possible to perform instruction of information required for camera processing or the compression processing from ECU 116 to camera units 112, 113, 114 and 115. Examples of the information required for the camera processing include photographing start, photographing stop, and the like. Examples of the information required for the compression processing include a bit-depth, a control threshold, and the like.

According to the configuration, it is possible to watch a video photographed by each camera on monitor 117, to record in ECU 116, and the like while controlling camera units 112, 113, 114 and 115.

Figure 12:
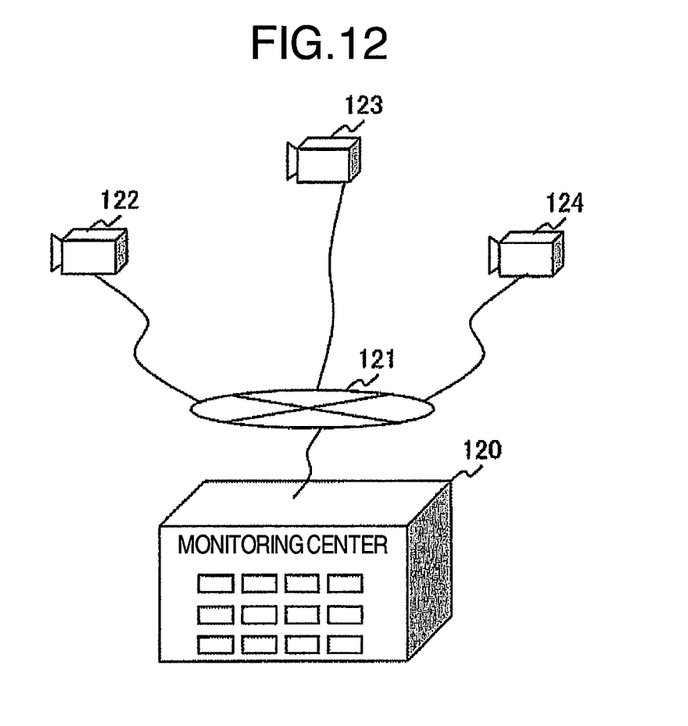
FIG. 12 is an example of a monitoring camera system.

FIG. 12 is a block diagram illustrating an example of the monitoring system. This example illustrates an exemplary monitoring system in which camera units 122, 123 and 124, and monitoring center 120 are connected to network 121.

Camera units 122, 123 and 124 photograph ambient video information of each place where the each camera unit is installed, and transmit the information to network 121. The video information may be transmitted to network 121 in an uncompressed state, or may be transmitted to network 121 after being subjected to compression processing in camera units 122, 123 and 124.

Monitoring center 120 receives the video information transmitted to network 121, and analyzes the video information. Monitoring center 120 performs decompression processing in a case where the video information to be input is compressed. The monitoring center may have a monitor that displays the video information.

Monitoring center 120 and camera units 122, 123 and 124 are capable of exchanging a control signal via network 111. For example, it is possible to indicate information required for camera processing or the compression processing from monitoring center 120 to camera units 122, 123 and 124. Examples of the information required for the camera processing include photographing start, photographing stop, and the like. Examples of the information required for the compression processing include a bit-depth, a control threshold, and the like.

According to the configuration, it is possible to watch and record a video photographed by each camera by monitoring center 120 while controlling the cameras 122, 123 and 124 from monitoring center 120.

Figure 13:
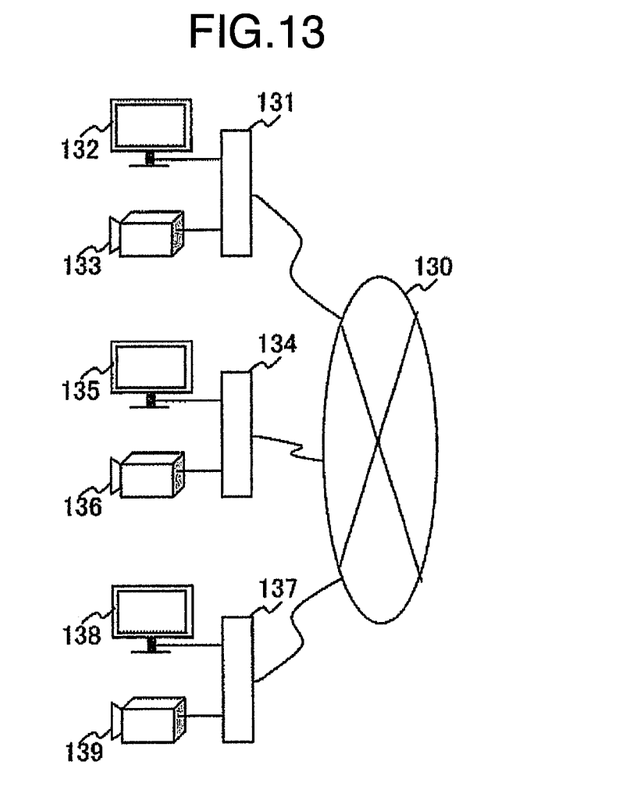
FIG. 13 is an example of a teleconference system.

FIG. 13 is a block diagram illustrating an example of the teleconference system. This example illustrates an exemplary teleconference system in which terminal units 131, 134 and 137 are connected to network 130. Terminal unit 131 has camera unit 133 and monitor unit 132.

Camera unit 133 photographs ambient video information of a place where the camera unit is installed, and outputs the information to terminal unit 131. Terminal unit 131 transmits the received video information to network 130. The video information may be transmitted to network 130 without compression, or may be transmitted to network 130 after compression processing in camera unit 133 or terminal unit 131. In addition, terminal unit 131 inputs the video information to be transmitted to network 130, and outputs the information to monitor unit 132.

Monitor unit 132 performs display of the inputted video information. In a case where the video information to be inputted is compressed, the video information is subjected to decompression processing in terminal unit 131 or monitor unit 132, and the decoded video information is displayed in the monitor unit.

Terminals 134 and 137 have the equivalent function as terminal 131, and thus, the description thereof will be omitted. Terminal units 131, 134 and 137 are capable of exchanging a control signal among the respective terminal units via network 130. For example, it is possible to perform instruction of information require for camera processing or compression processing from terminal unit 131 to terminal unit 134. Examples of the information required for the camera processing include photographing start, photographing stop, and the like. Examples of the information required for the compression processing include a bit-depth, a control threshold, and the like.

According to the configuration, the exchange of the video information or audio information among terminal units 131, 134 and 137, and thus, the teleconference system can be realized.

Figure 10:
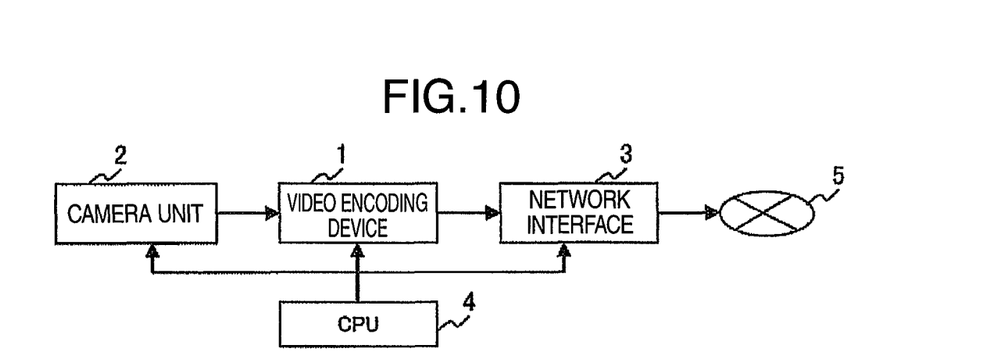
FIG. 10 is an example of a system in which the video encoding device according to the first embodiment or the second embodiment is used.

Next, a description will be made regarding an in-vehicle camera, a monitoring camera, and a camera for a teleconference system that are used in FIGS. 11 to 13. FIG. 10 is a block diagram illustrating an example of a camera system. Each block may be configured using hardware, or it may be configured such that a part of or the entire function of each block is realized using software.

Camera unit 2 is a block that digitizes a taken image, and outputs the digitized image. Video encoding device 1 is a block that encodes the image information output from camera unit 2 and outputs the encoded information. Network interface 3 is a block that outputs the video encoded data outputted from video encoding device 1 to network 5 such as LAN. CPU 4 is a block that controls camera unit 2, video encoding device 1, and network interface 3.

In the camera system of FIG. 10, the image taken in camera unit 2 is encoded by video encoding device 1, and then, outputs the encoded image to network 5 via network interface 3.

Figure 1:
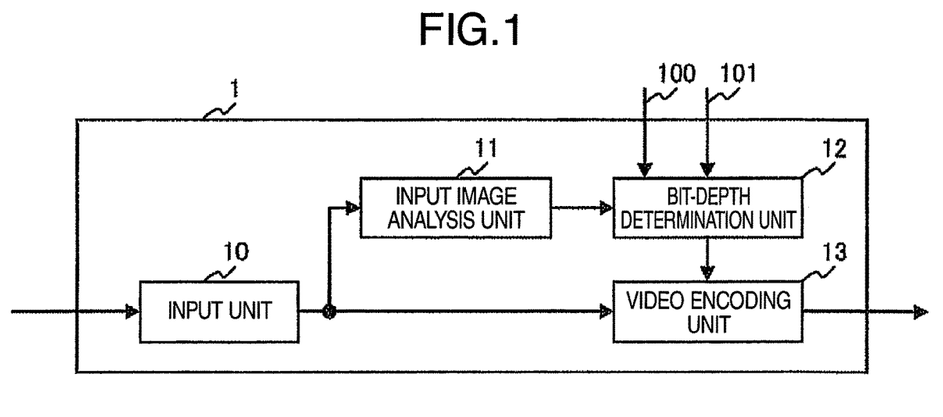
FIG. 1 is an example of a video encoding device according to a first embodiment.

Next, a description will be made regarding an operation of video encoding device 1 of FIG. 10. FIG. 1 is a block diagram illustrating an example of a video encoding device according to the present embodiment. Each block may be configured using hardware, or it may be configured such that a part of or the entire function of each block is realized using software.

Video encoding device 1 is a video encoding device that performs an encoding process on an input image, and outputs encoded video data. Video encoding device 1 is used in, for example, a broadcasting video delivery system, a broadcasting relay system, a portable terminal, a monitoring camera system, an in-vehicle camera system, and the like.

Input unit 10 is a block that inputs image data to the video encoding device. Examples of the image data which is inputted to the input unit include image data photographed by an external camera, image data recorded in external recording media, and the like.

Input image analysis unit 11 receives the image data taken by input unit 10, and extracts one-type or a plurality of types of feature amount of the image data for each feature amount extraction region. An example of the feature amount extraction region is a rectangular pixel block configured of one pixel, or X×Y pixels (X and Y are all positive numbers). An example of the rectangular pixel block is a macroblock configured of 16 pixels×16 pixels, which is a unit of the video encoding.

Examples of the feature amount of the image data include a luminance value, a chrominance value, a luminance or chroma variance, a luminance or chroma average value, a correlation value of luminance and chrominance, and the like. Examples of the average value include an average value of luminance values in the macroblock, and the like.

Bit-depth determination unit 12 receives the feature amount of the image data, feature amount threshold value 100, and range threshold value 101, and determines a bit-depth, and outputs the result. Bit-depth determination unit 12 extracts the feature amount extraction region in which the feature amount of the image data is equal to or larger than feature amount threshold value 100, and outputs a higher bit-depth in a case where a region in which the extracted feature amount extraction regions are continuous is equal to or larger than range threshold value 101, than the other case. Feature amount threshold value 100 and range threshold value 101 are supplied from CPU 4 in FIG. 10, for example. Incidentally, bit-depth determination unit 12 is also referred to as a bit-depth output unit.

An example of a unit of range threshold value 101 is a pixel. For example, when range threshold value 101 is set to 4096 pixels, a higher bit-depth is outputted in a case where the region in which the extracted feature amount extraction regions are continuous is equal to or larger than 4096 pixels, as compared to the case of being smaller than 4096 pixels.

Another example of the unit of range threshold value 101 is the feature amount extraction region. For example, a case where the feature amount extraction region is the macroblock configured of 16 pixels×16 pixels is assumed. When range threshold value 101 is set to 16 macroblocks, a higher bit-depth is outputted in a case where the region in which the extracted feature amount extraction regions are continuous is equal to or larger than 16 macroblocks, as compared to the case of being smaller than 16 macroblocks.

Examples of the bit-depth include 8-bit, 10-bit, and 12-bit. For example, 12-bit is outputted in a case where the region in which the extracted feature amount extraction regions are continuous is equal to or larger than range threshold value 101, and 8-bit is outputted in the other case in bit-depth determination unit 12.

Figure 4:
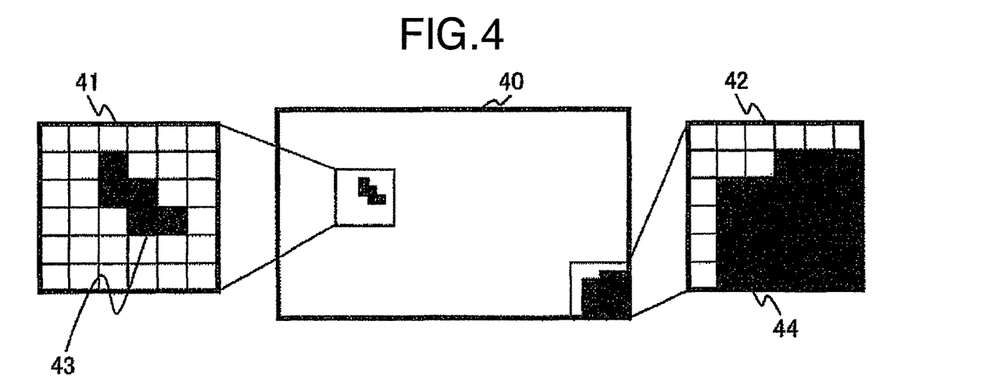
FIG. 4 is an example illustrating the image feature amount and the range within the feature amount threshold value according to the first embodiment.

FIG. 4 is a diagram illustrating an example in which the unit of range threshold value 101 is set to the feature amount extraction region. In the present embodiment, lower-limit value B0 is provided as feature amount threshold value 100, and upper-limit value A1 is provided as range threshold value 101. Frame 40 represents an image frame region to be encoded. A feature amount extraction region of a portion painted in black in frame 40 is a feature amount extraction region in which the feature amount of the image data is smaller than lower-limit value B0.

Image regions 41 and 42 are enlarged views of partial image regions in frame 40 each of which is configured of 6×6 feature amount extraction regions. Each feature amount extraction region is configured of 16 pixels×16 pixels. Image regions 43 and 44 painted in black are the feature amount extraction region in which the feature amount of the image data is smaller than lower-limit value B0. The number of the extracted continuous feature amount extraction regions in image region 41 is 5 regions. The number of the extracted continuous feature amount extraction regions in image region 42 is 23 regions.

In a case where upper-limit value A1 of range threshold value 101 is set to 4, the 5 regions and the 23 regions of the number of the extracted continuous feature amount extraction regions in frame 40 are all equal to or larger than upper-limit value A1, and thus, a bit-depth, which is higher than a bit-depth with respect to a frame configured only of an image region in which the number of the extracted continuous feature amount extraction regions is smaller than upper-limit value A1, is outputted as a bit-depth with respect to frame 40.

In addition, in a case where upper-limit value A1 of range threshold value 101 is set to 10, one of the 5 regions and 23 regions of the number of the extracted continuous feature amount extraction regions in frame 40 is equal to or larger than upper-limit value A1, and thus, a bit-depth, which is higher than a bit-depth with respect to the frame configured only of the image region in which the number of the extracted continuous feature amount extraction regions is smaller than upper-limit value A1, is output as the bit-depth with respect to frame 40.

In addition, in a case where upper-limit value A1 of range threshold value 101 is set to 100, the number of the extracted continuous feature amount extraction regions in frame 40 is smaller than upper-limit value A1, and thus, a bit-depth, which is lower than a bit-depth with respect to a frame including an image region in which the number of the extracted continuous feature amount extraction regions is equal to or larger than upper-limit value A1, is output as the bit-depth with respect to frame 40.

Figure 2:
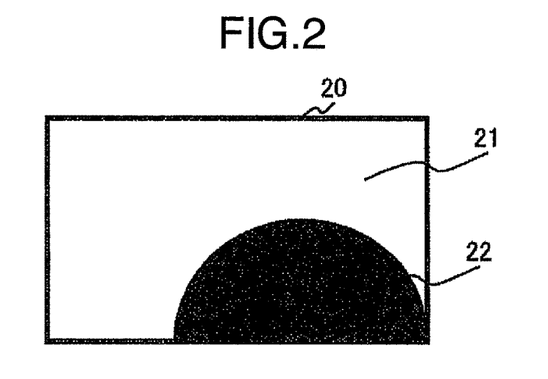
FIG. 2 is an example illustrating an image feature amount and a range within a feature amount threshold value according to the first embodiment.

FIG. 2 is an example of an image photographed by the in-vehicle camera. In FIG. 2, lower-limit value B0 is provided as feature amount threshold value 100, and upper-limit value A1 is provided as range threshold value 101, and a feature amount extraction region in which the feature amount of the image data is smaller than lower-limit value B0 is indicated by being-painted in black. Region 22 in frame 20 represents the feature amount extraction region in which the feature amount of the image data is smaller than lower-limit value B0. In addition, other region 21 represents a feature amount extraction region in which the feature amount of the image data is equal to or larger than lower-limit value B0.

For example, a case where a vehicle equipped with the in-vehicle camera system gets approaching a tunnel is assumed. In a case where region 22 corresponds to a tunnel portion, a range of region 22 increases as the vehicle approaches the tunnel. In a case where upper-limit value A1 of range threshold value 101 is set to N, bit-depth determination unit 12 outputs a lower bit-depth during a period until region 22 becomes N, than a case where region 22 is equal to or larger than N.

When the car approaches the tunnel as much as region 22 becomes equal to or larger than N, bit-depth determination unit 12 switches the bit-depth to be outputted, and outputs a higher bit-depth than the case in which region 22 is smaller than N. In this example, it is possible to average and reduce loads of the encoding process by outputting a lower bit-depth in a case where the car gets away from the tunnel than in a case where the car approaches the tunnel within a predetermined distance and enters the tunnel and switching to a bit-depth higher than the bit-depth that has been outputted until then at a point in time at which the car approaches the tunnel and there occurs a need to view the inside of the tunnel in detail.

Figure 3:
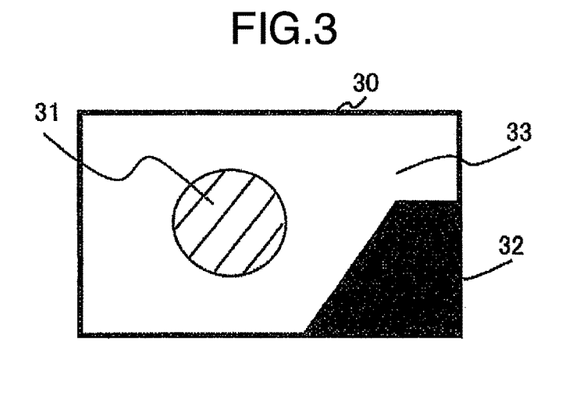
FIG. 3 is another example illustrating the image feature amount and the range within the feature amount threshold value according to the first embodiment.

FIG. 3 is an example of the image photographed by the in-vehicle camera. In FIG. 3, upper-limit value A0 and lower-limit value B0 are provided as the feature amount threshold value, upper-limit value A1 is provided as range threshold value 101, the feature amount extraction region in which the feature amount of the image data is smaller than lower-limit value B0 is indicated by being-painted in black, and a feature amount extraction region in which the feature amount of the image data is equal to or larger than upper-limit value A0 is indicated by oblique lines. Among image regions in frame 30, region 32 represents a region in which the feature amount of the image data is smaller than lower-limit value B0. Region 31 represents a region in which the feature amount of the image data is equal to or larger than upper-limit value A0. Region 33 represents a region in which the feature amount of the image data is equal to or larger than lower-limit value B0, and further, is smaller than upper-limit value A0.

In a case where the number of the extracted continuous feature amount extraction regions in frame 30 is equal to or larger than range threshold value 101, a higher bit-depth is outputted. In a case where the macroblock is exemplified as the feature amount extraction region and an average luminance value per macroblock is exemplified as the feature amount, region 31 becomes a high luminance region and region 32 becomes a low luminance region. It is possible to perform the encoding process with a higher bit-depth with respect to a frame in which the high luminance region or the low luminance region equal to or larger than a predetermined region is present, as compared to a bit-depth with respect to the other frame, by applying the present embodiment. Accordingly, it is possible to suppress a blown out highlight in the high luminance region, and improve visibility of a dark portion in the low luminance region.

Figure 5:
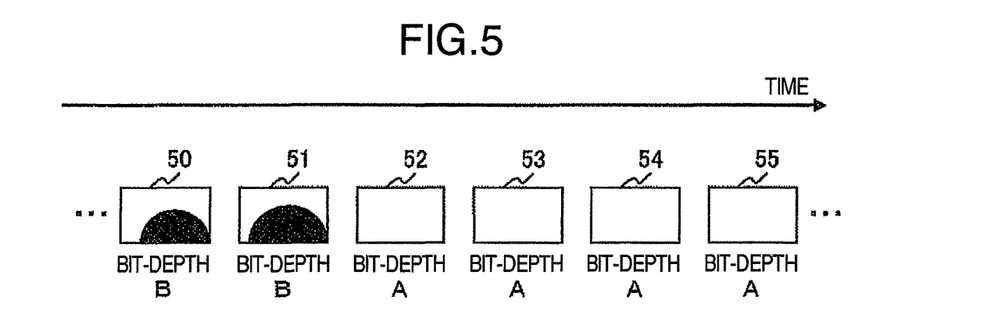
FIG. 5 is an example illustrating the range within the feature amount threshold value and a range threshold value according to the first embodiment.

FIG. 5 illustrates an example in which image frames are arranged in time order. In FIG. 5, lower-limit value B0 is provided as feature amount threshold value 100, and upper-limit value A1 is provided as range threshold value 101.

Frames 50, 51, 52, 53, 54 and 55 represent the image frames arranged in time order. A portion painted in black in each of the frames represents a region in which the feature amount of the image data is smaller than lower-limit value B0, and further, the number of the extracted continuous feature amount extraction regions is equal to or larger than upper-limit value A1.

Frames 50 and 51 include the region in which the feature amount of the image data is smaller than lower-limit value B0, and further, the number of the extracted continuous feature amount extraction regions is equal to or larger than upper-limit value A1.

On the other hand, frames 52, 53, 54 and 55 do not include the region in which the feature amount of the image data is smaller than lower-limit value B0, and further, the number of the extracted continuous feature amount extraction regions is equal to or larger than upper-limit value A1.

Here, when bit-depth A is assumed to be lower than bit-depth B, bit-depth B is outputted in a case where the region in which the feature amount of the image data is smaller than lower-limit value A0, and further, the number of the extracted continuous feature amount extraction regions is equal to or larger than upper-limit value A1 is present, and bit-depth A is outputted in the other case.

In the example of FIG. 5, bit-depth B is outputted with respect to frames 50 and 51, and bit-depth A is outputted with respect to frames 52, 53, 54 and 55. Accordingly, it is possible to reduce the loads of the encoding process and the power consumption as compared to a case in which a high bit-depth is outputted with respect to the entire frame.

Figure 6:
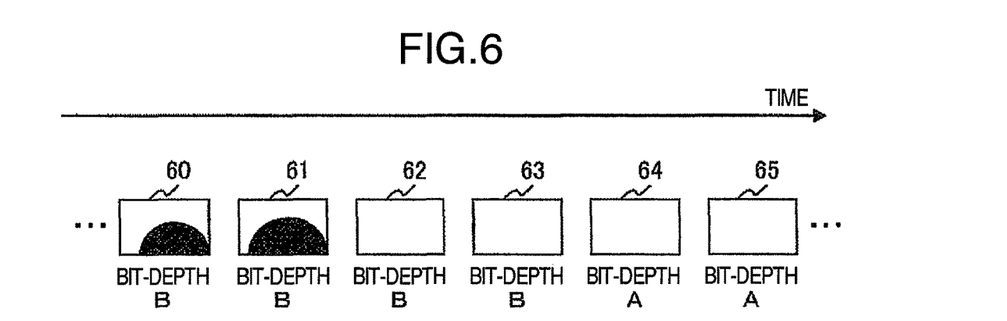
FIG. 6 is an example illustrating a bit-depth for each frame according to the first embodiment.

FIG. 6 illustrates another example in which the image frames are arranged in time order. In FIG. 6, lower-limit value B0 is provided as feature amount threshold value 100 and upper-limit value A1 and dead zone information C1 are provided as range threshold value 101.

The dead zone information is information for maintaining an existing bit-depth for a designated number of frames without changing the bit-depth in the case that corresponds to a condition under which the bit-depth is changed. A unit of dead zone information C1 is the number of frames, and a value of dead zone information C1 is set to 2 in FIG. 6.

Frames 60, 61, 62, 63, 64 and 65 represent image frames arranged in time order. A portion painted in black in each of the frames represents a region in which the feature amount of the image data is smaller than lower-limit value B0, and further, the number of the extracted continuous feature amount extraction regions is equal to or larger than upper-limit value A1.

Frames 60 and 61 include the region in which the feature amount of the image data is smaller than lower-limit value B0, and further, the number of the extracted continuous feature amount extraction regions is equal to or larger than upper-limit value A1.

On the other hand, frames 62, 63, 64 and 65 do not include the region in which the feature amount of the image data is smaller than lower-limit value B0, and further, the number of the extracted continuous feature amount extraction regions is equal to or larger than upper-limit value A1.

Here, when bit-depth A is assumed to be lower than bit-depth B as similarly to FIG. 5, bit-depth B is outputted with respect to frames 60 and 61 that include the region in which the feature amount of the image data is smaller than lower-limit value A0, and further, the number of the extracted continuous feature amount extraction regions is equal to or larger than upper-limit value A1.

With respect to frames 62, 63, 64 and 65 that do not include the region in which the feature amount of the image data is smaller than lower-limit value A0, and further, the number of the extracted continuous feature amount extraction regions is equal to or larger than upper-limit value A1, bit-depth B, which is the immediately preceding bit-depth, is maintained for the number of frames indicated by dead zone information C1, that is, two frames, that is, frames 62 and 63. Further, bit-depth A is output for following frames after the number of frames indicated by dead zone information C1, that is, two frames, that is, frames 64 and 65.

It is possible to avoid a frequent switching of the bit-depth, or a wrong switching of the bit-depth through the process illustrated in FIG. 6.

Figure 7:
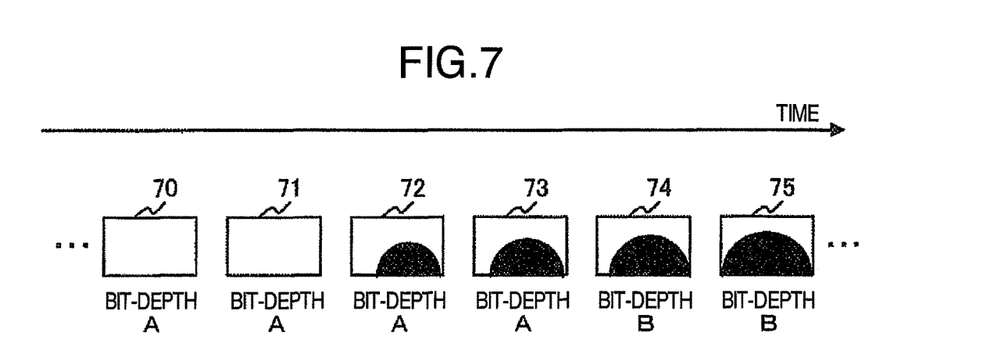
FIG. 7 is another example illustrating the bit-depth for each frame according to the first embodiment.

FIG. 7 illustrates still another example in which the image frames are arranged in time order. In FIG. 7, lower-limit value B0 is provided as feature amount threshold value 100, and upper-limit value A1 and dead zone information D1 are provided as range threshold value 101. The unit of dead zone information D1 is the number of frames. In FIG. 7, a value of dead zone information D1 is set to 2.

Frames 70, 71, 72, 73, 74 and 75 represent image frames arranged in time order. A portion painted in black in each of the frames represents a region in which the feature amount of the image data is smaller than lower-limit value B0, and further, the number of the extracted continuous feature amount extraction regions is equal to or larger than upper-limit value A1.

Frames 70 and 71 do not include the region in which the feature amount of the image data is smaller than lower-limit value B0, and further, the number of the extracted continuous feature amount extraction regions is equal to or larger than upper-limit value A1.

On the other hand, frames 72, 73, 74 and 75 include the region in which the feature amount of the image data is smaller than lower-limit value B0, and further, the number of the extracted continuous feature amount extraction regions is equal to or larger than upper-limit value A1.

Here, when bit-depth A is assumed to be lower than bit-depth B as similarly to FIG. 5, bit-depth A is output with respect to frames 70 and 71 that include the region in which the feature amount of the image data is smaller than lower-limit value A0, and further, the number of the extracted continuous feature amount extraction regions is equal to or larger than upper-limit value A1. With respect to frames 72, 73, 74 and 75 that do not include the region in which the feature amount of the image data is smaller than lower-limit value A0, and further, the number of the extracted continuous feature amount extraction regions is equal to or larger than upper-limit value A1, bit-depth A, which is the immediately preceding bit-depth, is maintained for the number of frames indicated by dead zone information D1, that is, two frames, that is, frames 72 and 73. Further, the high bit-depth A is output for following frames after the number of frames indicated by dead zone information D1, that is, two frames, that is, frames 74 and 75.

It is possible to avoid the frequent switching of the bit-depth, or the wrong switching of the bit-depth through the process illustrated in FIG. 7.

Figure 8:
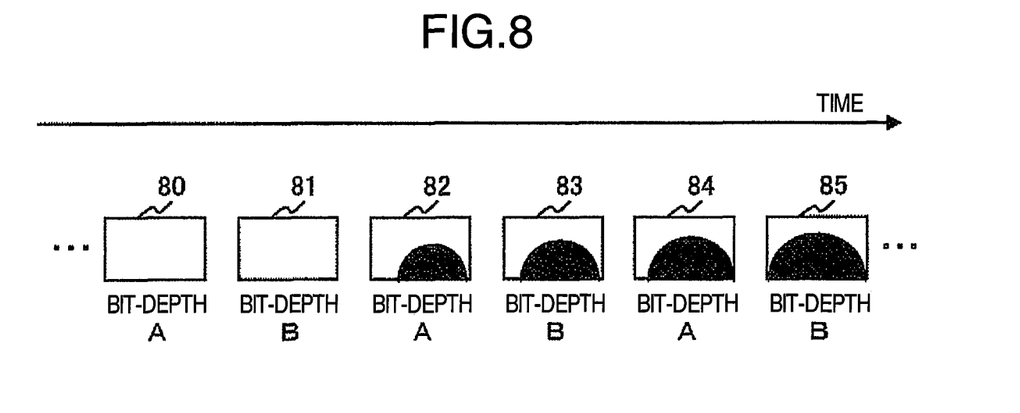
FIG. 8 is still another example illustrating the bit-depth for each frame according to the first embodiment.

FIG. 8 illustrates further still another example in which the image frames are arranged in time order. In FIG. 8, lower-limit value B0 is provided as feature amount threshold value 100, and upper-limit value A1 and high bit-depth insertion interval information E1 are provided as range threshold value 101.

The high bit-depth insertion interval information is information that indicates a frame interval at which high bit-depth B is inserted. A unit of bit-depth insertion interval information E1 is the number of frames. In FIG. 8, a value of bit-depth insertion interval E1 is set to 2.

Frames 80, 81, 82, 83, 84 and 85 represent image frames arranged in time order. A portion painted in black in each of the frames represents a region in which the feature amount of the image data is smaller than lower-limit value B0, and further, the number of the extracted continuous feature amount extraction regions is equal to or larger than upper-limit value A1.

Frames 80 and 81 do not include the region in which the feature amount of the image data is smaller than lower-limit value B0, and further, the number of the extracted continuous feature amount extraction regions is equal to or larger than upper-limit value A1.

On the other hand, frames 82, 83, 84 and 85 include the region in which the feature amount of the image data is smaller than lower-limit value B0, and further, the number of the extracted continuous feature amount extraction regions is equal to or larger than upper-limit value A1.

In FIG. 8, high bit-depth B is outputted for each frame interval indicated by high bit-depth insertion interval E1 regardless of the feature amount of the image data, and a low bit-depth is output with respect to the other frames.

It is possible to avoid the frequent switching of the bit-depth, or the wrong switching of the bit-depth through the process illustrated in FIG. 8.

In the above-described embodiment, the switching of the bit-depth has been performed depending on whether the region in which the feature amount of the image data is smaller than lower-limit value B0, and the number of the extracted continuous feature amount extraction regions is equal to or larger than upper-limit value A1 is present, but the switching of the bit-depth may be controlled in another method based on the feature amount of the image data. For example, a higher bit-depth is outputted in a case where an area or a ratio of a region in which the feature amount is smaller than a predetermined lower-limit value (for example, a ratio that accounts for one frame) is equal to or larger than a predetermined threshold value, than the case of being smaller than the predetermined value.

Figure 9:
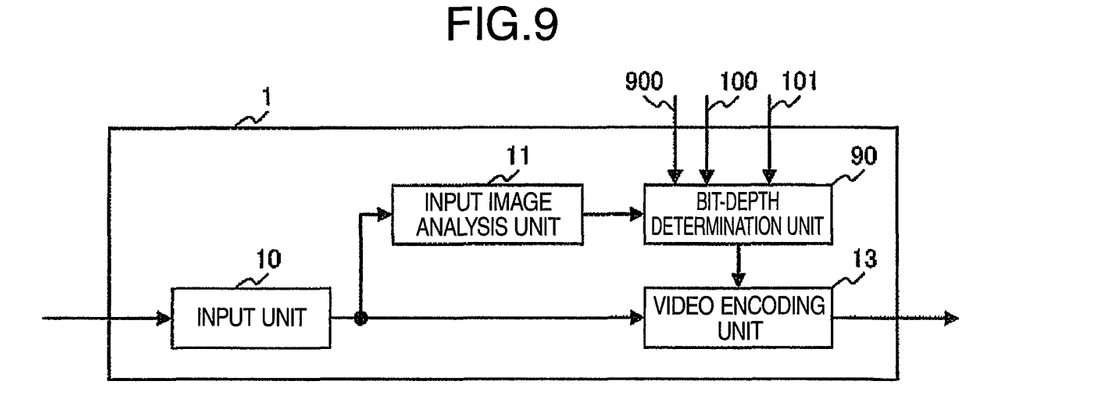
FIG. 9 is an example of a video encoding device according to a second embodiment.

FIG. 9 is a block diagram illustrating another example of the video encoding device. Each block may be configured using hardware, or it may be configured such that a part of or the entire function of each block is realized using software.

A video encoding device of FIG. 9 is configured such that external environment information 900 is further inputted to bit-depth determination unit 90 in the video encoding device illustrated in FIG. 1. External environment information 900 is supplied from CPU 4 of FIG. 10, for example, as similarly to feature amount threshold value 100 and range threshold value 101. Incidentally, bit-depth determination unit 90 is also referred to as a bit-depth output unit.

When a remaining amount of power of a battery to which the present video encoding device is connected is exemplified as external environment information 900 and a power amount threshold value is exemplified as feature amount threshold value 100, a lower bit-depth is outputted in a case where the remaining amount of power of the battery to which the present video encoding device is connected is smaller than the power amount threshold value, as compared to the other case. Accordingly, in a case where the remaining amount of power of the battery to which the present video encoding device is connected decreases, it is possible to save power of the video encoding device.

According to the above-described embodiments, it is possible to reduce the power consumption by changing the bit-depth depending on the image feature or the remaining amount of power.

REFERENCE SIGNS LIST

1 Video encoding device
10 Input unit
11 Input image analysis unit
12 Bit-depth determination unit
13 Video encoding unit
100 Feature amount threshold value
101 Range threshold value

The invention claimed is:
1. An imaging apparatus, comprising:
imaging circuitry configured to digitize image data having been input into the imaging apparatus, and to output digitized image data as image information;
analyzing circuitry configured to analyze features in each of a plurality of frames of the image information output from the imaging circuitry;
bit-depth output circuitry configured to determine and output bit-depth information for video encoding with respect to the image information, the bit-depth information being related to gradation of the image information;
encoding circuitry configured to perform an encoding process on the image information output from the imaging circuitry using the bit-depth information output from the bit-depth output circuitry,
wherein the bit-depth output circuitry is further configured to determine and output the bit-depth information in accordance with a ratio of regions in a first frame within the frames of the image information in which a feature amount obtained by the analyzing circuitry is larger than a predetermined threshold value,
wherein the bit-depth output circuitry is further configured to maintain a first bit-depth information output during a predetermined amount of frames, and
wherein the bit-depth output circuitry is further configured to output a second bit-depth information after the predetermined amount of frames.
2. The imaging apparatus according to claim 1, wherein the encoding circuitry performs the encoding process on the first frame in accordance with the bit-depth information having been determined and output in accordance with the ratio of regions in the first frame within the frames.

3. The imaging apparatus according to claim 1, wherein the bit-depth output circuitry outputs the first bit-depth information upon a size of the regions in the first frame within the frames, in which a feature amount obtained by the analyzing circuitry is larger than the predetermined threshold value, is equal or larger than a predetermined size, and outputs the second bit-depth information upon a size of the regions in the first frame within the frames, in which a feature amount obtained by the analyzing circuitry is larger than the predetermined threshold value, is smaller than the predetermined size.

4. The imaging apparatus according to claim 3, wherein the first bit-depth information indicates a first bit-depth which is larger than a second bit-depth indicated by the second bit-depth information.

5. The imaging apparatus according to claim 1, further comprising a network interface configured to output data having been output from the encoding circuitry to a network.

6. The imaging apparatus according to claim 5, wherein the network interface is configured to receive information indicating a photographing start or a photographing stop.

7. The imaging apparatus according to claim 1, wherein the imaging apparatus is configured to be connected with a battery, and wherein the bit-depth output circuitry is further configured to output a lower bit-depth than a predetermined value of bit-depth as the bit-depth information upon a remaining amount of power of the battery being smaller than a predetermined threshold value of power.

8. The imaging apparatus according to claim 1, wherein the image information relates to a moving image.

9. The imaging apparatus according to claim 1, the feature amount relates to a luminance value.

10. The imaging method according to claim 1, further comprising the step of outputting data, by a network interface, having been output from the encoding process to a network.

11. The imaging method according to claim 10, further comprising the step of receiving information indicating a photographing start or a photographing stop, by the network interface.

12. An imaging apparatus, comprising:
    imaging circuitry configured to digitize image data having been input into the imaging apparatus, and to output digitized image data as image information;
    analyzing circuitry configured to analyze features in each of a plurality of frames of the image information output from the imaging circuitry;
    bit-depth output circuitry configured to determine and output bit-depth information for video encoding with respect to the image information, the bit-depth information being related to gradation of the image information;
    encoding circuitry configured to perform an encoding process on the image information output from the imaging circuitry using the bit-depth information output from the bit-depth output circuitry,
    wherein the bit-depth output circuitry is further configured to determine and output the bit-depth information in accordance with a ratio of regions in a first frame within the frames of the image information in which a feature amount obtained by the analyzing circuitry is larger than a predetermined threshold value, and
    wherein the bit-depth output circuitry is further configured to change a first bit-depth information output at the first frame to a second bit-depth information output after a predetermined amount of frames from the first frame.

13. An imaging method of an imaging apparatus, comprising:
    digitizing image data having been input into the imaging apparatus, and outputting digitized image data as image information;
    analyzing features in each of a plurality of frames of the output image information;
    determining and outputting bit-depth information for video encoding with respect to the image information, the bit-depth information being related to gradation of the image information;
    perform an encoding process on the output image information using the output bit-depth information; and
    determining and outputting the bit-depth information in accordance with a ratio of regions in a first frame within the frames of the output image information in which a feature amount obtained by the analyzing is larger than a predetermined threshold value,
    wherein a first bit-depth information is maintained to be output during a predetermined amount of frames, and
    wherein a second bit-depth information is output after the predetermined amount of frames.

14. The imaging method according to claim 13, wherein the encoding process is performed in accordance with the bit-depth information having been determined and output in accordance with the ratio of regions in the first frame within the frames.

15. The imaging method according to claim 13, further comprising the steps of:
    outputting the first bit-depth information upon a size of the regions in the first frame within the frames, in which a feature amount obtained by the analyzing is larger than the predetermined threshold value, is equal or larger than a predetermined size; and
    outputting the second bit-depth information upon a size of the regions in the first frame within the frames, in which a feature amount obtained by the analyzing is larger than the predetermined threshold value, is smaller than the predetermined size.

16. The imaging method according to claim 15, wherein the first bit-depth information indicates a first bit-depth which is larger than a second bit-depth indicated by the second bit-depth information.

17. The imaging method according to claim 13, further comprising the step of outputting a lower bit-depth than a predetermined value of bit-depth as the bit-depth information upon a remaining amount of power of the battery being smaller than a predetermined threshold value of power.

18. The imaging method according to claim 13, wherein the image information relates to a moving image.

19. The imaging method according to claim 13, the feature amount relates to a luminance value.

20. An imaging method of an imaging apparatus, comprising:
    digitizing image data having been input into the imaging apparatus, and outputting digitized image data as image information;
    analyzing features in each of a plurality of frames of the output image information;
    determining and outputting bit-depth information for video encoding with respect to the image information, the bit-depth information being related to gradation of the image information;

perform an encoding process on the output image information using the output bit-depth information; and determining and outputting the bit-depth information in accordance with a ratio of regions in a first frame within the frames of the output image information in which a feature amount obtained by the analyzing is larger than a predetermined threshold value, wherein a first bit-depth information output at the first frame is changed to a second bit-depth information after a predetermined amount of frames from the first frame.

* * * * *